United States Patent Office 3,457,088
Patented July 22, 1969

3,457,088
PROCESS FOR PRODUCING A POTATO GRANULE PRODUCT FROM COMMERCIAL POTATO FLAKES AND POTATO GRANULES
Roderick G. Beck, Blackfoot, Idaho, assignor to American Potato Company
No Drawing. Filed Apr. 14, 1966, Ser. No. 542,462
Int. Cl. A23l 1/12
U.S. Cl. 99—207                          3 Claims

ABSTRACT OF THE DISCLOSURE

A process for making potato granules by moistening potato flakes sufficiently to form a smooth, damp, non-particulate mix, equilibrating the mix, and adding sufficient potato granules to equilibrated mix to form a moist friable intermediate. The intermediate is mixed, retrograded, and remixed to produce a damp powder which is conventionally dried to yield the desired potato granules.

---

This invention relates to a new process for manufacturing potato granules and more particularly to a process which utilizes a mixture of potato flakes and potato granules to produce a fine granular product with the performance characteristics of potato granules produced by the add-back process.

Two types of dehydrated potato products from which instant mashed potatoes can be made by reconstitution in liquid have met with acceptance by housewives, institutions, and the Armed Forces. Potato granules and potato flakes are both produced commercially in large amounts. The advantages and disadvantages of both are discussed thoroughly in the prior art such as U.S. Patents. Nos. 3,067,042; 2,988,543; 3,063,849; and 3,021,223. These can be summarized as follows:

Potato flakes (commercial density about 15 lbs. [cu. ft.])

(1) Will not tolerate boiling liquid reconstitution or whipping.
(2) Density is too low for Armed Forces and most institutional uses.
(3) Density is too low for economical inert gas packaging.

Advantages:

(1) Low density is an advantage in housewife applications.
(2) Can be reconstituted in cold liquid for specialized applications such as frozen TV dinners.

Potato granules (commercial density about 56 lbs. [cu. ft.])

Advantages:

(1) High density is an advantage for Armed Forces and most institutional uses.
(2) High density allows efficient inert gas packaging which aids storage stability.
(3) Potato granules can be reconstituted in boiling liquid and can stand whipping without creating poor texture or pastiness.

Disadvantages:

(1) High density undesirable for retail sale and use.
(2) Will not reconstitute in cold liquid.

The prior art cited above deals with processes and products which attempt to retain the natural advantages and reduce or eliminate the disadvantages of commercial potato flakes.

In U.S. No. 3,067,042, potato flakes are broken to increase the bulk density. The fine fraction which would cause pastiness and starchiness is screened out and added to the mash of the subsequent lot. Precooking and monoglycerides are said to allow this to be done without excessive texture degradation if the percentage of fines is not too high.

In U.S. No. 3,063,849 potato flakes are also ground to pass ⅛ inch. Stickiness which would result from the breaking step is nullified by a final heating step which retrogrades the free soluble starch. The final heated product has a baked potato flavor and is said to be excellent in soups.

In U.S. No. 2,980,543 potato flakes are broken and an "improver" is sprayed on the dry broken flakes to counteract the stickiness created by breaking.

In U.S. No. 3,021,223 potato flakes are broken and then are increased in moisture and manipulated to produce products of increased density. If the moisture is increased to 36–45%, the density of the end product is comparable to potato granules. If the moisture is increased to 25–35%, the density is increased from about 15 lbs./cu. ft. to 35–52 lbs./cu. ft. The end product consists of thick small flakes called flakelets.

Although the processes disclosed in the prior art have resulted in increasing the bulk density of potato flakes, I have found that desirable characteristics have been lost. When dry potato flakes are reduced in size until the density is comparable to that of potato granules, the large quantities of free starch formed causes pastiness in the reconstituted mash even with the use of improvers. When ruptured cells are returned to a fresh mash, even precooking and the use of monoglyceride allow only a small percentage of free starch to be tolerated without pastiness. When excessive heat is used on broken flakes to accomplish retrogradation of soluble free starch, flavor is changed. Furthermore, starch retrogradation reduces water uptake and destroys the ability to reconstitute in cold liquid. Any processing step conducted at high moisture and room temperature incorporated with any appreciable holding time will result in retrogradation and the inevitable loss of desirable rehydration characteristics.

The object of the present invention is to produce by a continuous and practical process a dried potato product with all the advantages of potato granules, using commercial potato flakes as the principal starting ingredient in the process.

Since one of the major differences between the flake and granule processes is the absence of a retrogradation step in the flake process and the necessity of retrogradation in the granule process to attain proper granulation, a study of the effect of (a) moisture content, (b) time, and (c) temperature of retrogradation on cold water absorption was made.

When 100% of −8 mesh potato flakes as well as various mixtures of −8 mesh potato flakes and potato granules were moistened to 42% moisture, mixed, conditioned by standing one hour at room temperature, mixed, and dried, substantial differences were obvious. The dry end product made from −8 mesh flakes alone was very coarse in granulation —50% failed to pass a 20 mesh screen and only 14% passed an 80 mesh screen. The use of −8 mesh potato flakes to produce a fine end product was found to be completely impractical. Although the small percentage of fine material was comparable to potato granules, the coarse half of the end product has such poor reconstitution characteristics that it would be commercially unacceptable. The suggested processing step in the prior art of foring the coarse fraction through a 0.023 inch opening after sieving the moist mix over a 20 mesh screen is not only extremely damaging to the sensitive potato cells but commercially completely impractical. In contrast, when one part by weight potato granules was mixed with three parts by weight of −8 mesh potato flakes and handled in exactly the same manner, a very fine damp powder which could be directly dried without further treatment was obtained. The incorporation of a minor percentage of potato granules had surprisingly resulted in a vastly improved product and process.

A second series of tests was run using various moisture levels between 25 and 45% for re-wetting the mixture of 75% −8 mesh potato flakes and 25% potato granules prior to final dehydration. All mixes were allowed to condition by standing at room temperature for one hour, followed by a second mixing step just prior to final drying with the following results:

| Test No. | Rewet moisture | Granulation | | | Cold water rehydration (5:1) |
|---|---|---|---|---|---|
| | | +20 | −20 +80 | −80 | |
| 10 | 25 | 25 | 59 | 16 | Excellent. |
| 11 | 30 | 30 | 61 | 9 | Good. |
| 12 | 35 | 20 | 67 | 13 | Fair. |
| 13 | 40 | 36 | 56 | 8 | Poor. |
| 6 | 45 | 25 | 64 | 21 | Very poor. |

The results obtained were completely unexpected. The literature indicates that the retrogradation of soluble potato amylose proceeds most rapidly at about 29% moisture: however, in these tests, I found the higher moistures apparently promoted the conversion to insoluble amylose and destroyed the ability of the resulting dry product to rehydrate satisfactorily in cold water. The lower moisture contents of 25 and 30% gave comparable granulation and in the case of the former, retained the ability of the original flake component to rehydrate in cold water. At 30% moisture, the abiltiy to rehydrate in cold water was mostly retained. Apparently, no appreciable retrogradation took place at these lower moisture levels.

A third series tests was run using a 75% −8 potato flake—25% potato granule mix at 40% moisture. Mixing was identical to previous tests but the conditioning times and temperatures were varied with the following results:

| Test No. | Conditioning time | Conditioning temperature (° F.) | Granulation | | | Cold water rehydration (5:1) |
|---|---|---|---|---|---|---|
| | | | +20 | −20 +80 | −80 | |
| 8 | 0 | | 68 | 28 | 4 | Excellent. |
| 16 | 15 minutes | 70 | 42 | 50 | 8 | Good. |
| 17 | 30 minutes | 70 | 26 | 64 | 10 | Fair. |
| 13 | 1 hour | 70 | 36 | 56 | 8 | Poor. |
| 18 | do | 35 | 32 | 56 | 12 | Very poor. |
| 19 | do | 140 | 29 | 61 | 10 | Good. |

The results here were as expected. The literature indicates that increased time at decreased temperatures encourages retrogradation of potato amylose. In every case, granulation improved and cold water rehydration was reduced with increases of time or decreases of temperature. Although, prolonged holding at 140° F. gave acceptable granulation, the ability to reconstitute in cold water was impaired somewhat.

We then tested our process with still another variation. Instead of mixing the −8 mesh flakes and the granules dry before rewetting, we used the same amount of total water applied first to the flake portion and we were able to produce a product with all the desirable characteristics of potato granules. Standard commercial potato flakes were uniformly moistened with cold water to 46% moisture. The moistened flakes were then allowed to equilibrate and retrograde for 30 minutes. The wet flakes were then mixed with dry commercial potato granules equal in weight to one-third the solids of the flakes. The moisture of the mix was now 40% as before and the source of the potato solids was still 75% flakes—25% granules. The moist mix was then allowed to stand one hour before mixing again to further granulate the product. The mix was then dried and screened over a 20 mesh screen. Approximately 95% of the dried product passed through the 20 mesh screen. This product had a density of about 44 lbs./cu. ft. and more than 30% passed a standard 80 mesh screen. If a −20 mesh product is the desired final product the small percentage of coarser fraction could be rewet along with the potato flakes in a continuous process. This eliminates the necessity of forcing the damp mix through fine openings such as .023" which would be damaging to the potato cells and is a processing step which would be commercially impractical. The end product from this process has excellent flavor and texture and has all the advantages of potato granules—being capable of boiling water reconstrutcion and capable of whipping without texture damage. This product is much finer than could be obtained by partially reconstituting potato flakes alone and processing them in a comparable manner. By adding all the reconstitution water to the potato flake fraction alone, the advantages of higher moistures were obtained—namely, easier flake breakdown to potato cells and small agglomerates and faster retrogradation. By adding the dry potato granules after partial retrogradation, the moisture content of the mix is reduced thereby creating a friable mix which does not tend to agglomerate and results in a larger percentage of finer particles.

By using this process and with the addition of only a few pieces of conventional equipment, a conventional potato flake plant can be converted to produce a product very close to potato granules in appearance and density and with all the advantages of potato granules and none of the disadvantages of potato flakes. The potato flakes used as the starting material could be made by the accepted techniques now in use in potato flake manufacture including precooking and cooling prior to cooking and the addition of accepted additives such as emulsifiers, sulphites, and anti-oxidants.

I claim:

1. A process for producing potato granules from potato flakes without formation of inadmissible amounts of free starch comprising the steps of moistening potato flakes sufficiently to form a smooth, damp, non-particulate mix; equilibrating said mix; adding dry potato granules to provide a substantial minor fraction of the total potato solids in the mix to reduce the moisture thereof to not less than about 30% and to produce a moist friable intermediate; thoroughly mixing and allowing the intermediate to retrograde at room temperature; mixing the retrograded intermediate; and drying the resulting damp powder to produce a potato granule product.

2. The process of claim 1 in which the potato solids added as granules amounts to about 25% of the total.

3. The process of claim 1 in which the moisture of the initial flake mix is about 46%.

References Cited

UNITED STATES PATENTS 3,275,458   9/1966   Willard _____ 99—207

OTHER REFERENCES

Eskew et al.: Potato Flakes of Increased Density. September 1960 ARS—73–30, Agric. Res. Ser. U.S.D.A. (pp. 4–7).

LIONEL M. SHAPIRO, Primary Examiner

D. M. NAFF, Assistant Examiner